United States Patent [19]

Berazosky et al.

[11] 4,314,925

[45] Feb. 9, 1982

[54] CURABLE COMPOSITIONS

[75] Inventors: Sandra Berazosky; Harry A. Smith, both of Midland, Mich.

[73] Assignee: The Dow Chemical Company, Midland, Mich.

[21] Appl. No.: 238,300

[22] Filed: Feb. 26, 1981

Related U.S. Application Data

[63] Continuation-in-part of Ser. No. 81,295, Oct. 2, 1979.

[51] Int. Cl.$^3$ .............................................. C08K 5/06
[52] U.S. Cl. .............................................. 260/33.2 R
[58] Field of Search .................................. 260/33.2 R

[56] References Cited

U.S. PATENT DOCUMENTS 4,256,622  3/1981  Smith ............................ 260/33.2 R

*Primary Examiner*—William F. Hamrock
*Assistant Examiner*—Peter F. Kulkosky
*Attorney, Agent, or Firm*—Douglas N. Deline

[57] ABSTRACT

A heat-curable composition is disclosed comprising a hydroxyl-bearing polymer; a liquid, polyglycol hemiformal diluent; and an aminoplast or phenolic resin capable of curing the hydroxyl-bearing polymer. Optionally, a pigment may be added to the composition.

12 Claims, No Drawings

CURABLE COMPOSITIONS

CROSS-REFERENCE TO RELATED APPLICATION

This application is a continuation-in-part of our copending application Ser. No. 081,295, filed Oct. 2, 1979, now allowed.

BACKGROUND TO THE INVENTION

The invention relates to the use of a reactive diluent in common coating compositions made up of hydroxy-functional resins which are curable, by means of an aminoplast or phenolic resin, upon heating. Presently, low boiling diluents are employed as solvents for coating compositions and are removed upon heating said compositions in the curing process.

SUMMARY OF THE INVENTION

The instant invention comprises standard coating mixtures of hydroxy-functional resins in admixture with aminoplastic or phenolic curing agents therefor and, as a reactive diluent, a liquid, polyglycol hemi-formal of the formula

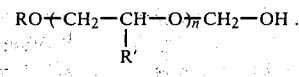

Preferred because of the decreased amount of volatiles produced during the heat curing step are hemi-formal diluents of the above formula having a normal boiling point greater than 150° C. The diluents of the instant invention, surprisingly, may be formulated into heat-curable compositions which do not require the presence of a catalyst such as a strong acid in order to effect reaction between the hydroxy-functional resin and the aminoplast or phenolic curing agent. The invention composition differs from the solvent-based coatings previously employed in the art in that it may be permanently incorporated in the final coating instead of being evaporated out as is commonly the case and the resultant coatings do not suffer losses in their physical properties as might be expected.

The invention comprises a curable composition comprising component (A) x parts by weight of a hydroxyl-bearing polymer; about 0.05x to about 3.0x parts by weight, which represents y-moles of component (B) a liquid, polyglycol hemi-formal diluent of the formula

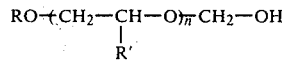

wherein R is a hydrocarbyl group of 1 to about 20 carbon atoms, R' is independently each occurrence hydrogen or methyl, and n is a positive number; component (C) an aminoplast or phenolic resole capable of curing component (A) to a tack-free state, present in from about (0.20x+z) to about (2.5x+5z) parts by weight, z being equal to y multiplied by the equivalent weight of component (C). Optionally, component (D), a catalytic amount of a strong acid or weak acid catalyst for the reaction between components (A) and (C), may be added, however such catalyst is not necessary in order to adequately cure the instant composition. The invention further comprises the above composition which has been heated at a temperature and for a length of time sufficient to cure same to a tack-free finish. The invention composition optionally comprises a pigment of the nature commonly employed in paints and other compositions.

DETAILED DESCRIPTION OF THE INVENTION

Component (A) of the invention is suitably any hydroxyl-bearing polymer which is commonly cured with an aminoplast or phenolic resin to form films and coatings. Component (A) suitably has at least two and preferably three or more free-hydroxyl groups. Such polymers are the free-hydroxyl containing polyesters such as are obtained by condensing di- or polycarboxylic acids with diols, glycols, triols or higher polyols in such a fashion and ratios that free-hydroxyls remain unreacted for further curing by means of the aminoplast resin. Solid epoxy resins, such as extended diglycidyl ethers of bisphenols, for example:

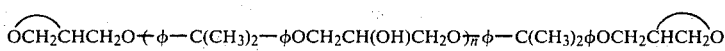

wherein n>1, are also suitable as component (A).

Another class of polymers suitably employed as component (A) are those obtained by polymerization of the unsaturated portion of vinyl monomers which bear or may be modified to bear free-hydroxyl groups which are ultimately pendant from the polyethylenic backbone. Examples of such polymers are poly(vinyl alcohols) which may be obtained by the hydrolysis of polymers derived from the polymerization of vinyl acetate with or without other vinylic unsaturated comonomers, from poly(hydroxyalkylacrylates) such as hydroxyethylacrylate and hydroxypropylacrylate with or without other comonomers and poly($\alpha,\beta$-unsaturated acids) derived from the polymerization of $\alpha,\beta$-unsaturated monomeric acids with or without other comonomers or by the polymerization and subsequent hydrolysis of esters thereof. Such monomeric acids are acrylic acid, methacrylic acid, itaconic acid, maleic acid, citraconic acid, cinnamic acid and the like.

Component (A) polymers are employed in some arbitrary amount, hereafter designated as x parts by weight.

Component (B) comprises about 0.05x to about 3.0x parts by weight, preferably about 0.10x to about 2.0x of a liquid polyglycol hemi-formal of the formula

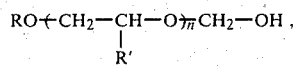

wherein R, R' and n are defined as above.

Preferably, Component (B) has a normal boiling point of about 150° C. or greater. Because the hemi-formal is essentially the reaction product of a polyglycol monoether with formaldehyde, the product may decompose into polyglycol monoether and formaldehyde at higher temperatures, e.g., temperatures of about 250° C. or more. This is not detrimental to performance of the hemi-formal in the invented composition, however, measurements of the normal boiling point of such compounds may not be possible because of this decomposition.

Component (C) is an aminoplast or phenolic resole resin, capable of curing component (A) to a tack-free state, and is unreactive in the composition under normal conditions but becomes reactive with component (A) at elevated temperatures on the order of 100° C.–250° C., preferably 120° C.–200° C. for a time sufficient to create the desired tack-free state, usually about 5–60 minutes or more. Suitable curing agents are aminoplast resins such as melamine-formaldehyde condensation products or urea-formaldehyde condensation products commonly available for this purpose and phenolic resole resins derived from the condensation of phenols and aldehydes and which are commonly used to cure the hydroxy-bearing solid epoxy resins previously described.

The quantity of component (C) to be employed is such that from about the sum of $0.20x+z$ up to about the sum of $2.5x+5z$ parts by weight of the aminoplast or phenolic resin are present in the invention composition, z being equal to y multiplied by the equivalent weight of component (C). The equivalent weights of aminoplast and phenolic resins are commonly available from the manufacturers thereof. Preferably, component (C) is present in at least about the sum of $0.20x+1.25z$ and is more preferably at least about the sum of $0.20x+1.5z$. Preferably, it is present in less than about the sum of $2.5x+3z$; and most preferably in less than about the sum of $2.5x+2.5z$.

As previously mentioned, it is preferred not to employ a catalyst in the invented composition as adequate cure times and good handling characteristics of the uncured resin, e.g., good pot life, etc. are obtained without use of a catalyst. However, no harm is caused by the presence of a catalyst and one may optionally be employed. Typical catalysts are the strong acids such as organosulfonic acids or their amine salts, sulfuric acid or its amine salts, zinc fluoroborate, phosphoric acid, boron trifluoride, (or its etherate), and the like. Also suitable are weak acid catalysts such as alkylphosphoric acid or chloroacetic acid. Also suitable are strong or weak acid ion-exchange resins. The catalysts may be employed in amounts from $0.0005x$ to about $0.05x$ part by weight, wherein x is as previously defined, as is already known in the art.

The curable composition of the invention is suitably prepared by simply mixing the components in any order at ambient temperature or slightly elevated temperatures less than the temperature required for the curing reaction. The curable composition of the invention may suitably be heated to about 50° C.–75° C. without effecting a premature cure. This facilitates handling, mixing and application of the invention composition. If desired, standard pigments such as titanium oxides, chromium oxides, zinc oxides and the like may be added in suitable amounts to impart a desired color to the invention composition. Similarly, surfactants or wetting agents may optionally be added to the composition as is common in the art.

The invention composition is applied to a substrate by any suitable means to form a film or coating thereon and the film or coating is then heated to the curing temperature by means commonly used in the art such as a hot air oven, a bank of infrared heat lamps or the like.

SPECIFIC EMBODIMENTS

The following examples serve to illustrate the composition of the invention, the curing and employment thereof for the preparation of films and coatings. Unless otherwise designated, the term "parts" when employed herein means parts by weight.

EXAMPLE 1

Preparation of Hemi-formal

One mole (275 g) of the monomethyl ether of polypropylene glycol of the formula

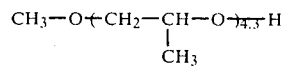

was combined with 91 percent paraformaldehyde (33.0 g, 1 mole) in the presence of 0.6 g paratoluene sulfonic acid catalyst. The reagents were mixed and heated to 100° C. with stirring. A clear solution resulted. Filtration to remove unreacted paraformaldehyde produced the desired hemi-formal of the formula

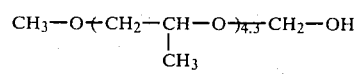

in 98 percent purity and about 94 percent yield.

EXAMPLE 2

Preparation of Coatings

The hemi-formal prepared above was combined with an acrylic resin and a melamine resin in the proportions indicated by Table I. The reactants were mixed until homogeneous and the coating formulation applied in a thin film to a preweighed aluminum panel. The panel was then reweighed and placed in a forced-air oven for 30 minutes at 150° C. The panel was then removed from the oven, cooled and reweighed. The difference (loss) in weight of the cured panels in percent is a measure of the volatiles in the composition. The percent volatiles is taken as a measure of the effectiveness of the diluent's incorporation into the cured coating composition.

TABLE I

| Run | Wt. Acrylic Resin[1] (g) | Solvent | Wt. Solvent (g) | Wt. Melamine resin[2] (g) | Wt. Catalyst[3] (g) | % Volatiles |
|---|---|---|---|---|---|---|
| 1 | 2.75 | Ex.[1] hemi-formal | 2.60 | 4.48 | <0.002[4] | 30.8 |
| 2 | 2.75 | Ex.[1] hemi-formal | 2.60 | 5.60 | <0.002 | 30.9 |
| 3* | 2.75 | PGM[5] | 2.60 | 4.98 | 0.04 | 33.9 |
| 4 | 2.75 | PGM[5] | 2.60 | 6.23 | 0.04 | 31.9 |
| 5 | 2.75 | PGM[5] | 2.60 | 7.48 | 0.04 | 33.9 |
| 6 | 2.75 | PGM[5] | 2.60 | 6.23 | — | 39.3 |
| 7 | 2.75 | PGM[5] | 2.60 | 7.48 | — | 39.5 |
| 8 | 2.75 | Ethoxyethyl Acetate | 2.18 | 1.48 | — | 50.85 |

*Runs 3–8 are comparative examples.
[1]The acrylic resin was a commercially available resin marketed as Acryloid AT-400.
[2]The melamine resin was trimethoxymethyl melamine having equivalent weight of 86 g sold commercially as Cymel 325.
[3]p-Toluene sulfonic acid.
[4]Present only as an impurity from hemi-formal production.
[5]Monomethyl ether of polypropylene glycol of the approximate formula

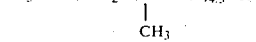

EXAMPLE 3

The coatings prepared according to Example 2 were then tested. Where applicable in the succeeding examples the following test procedures were employed. Hardness was determined using a Tukon hardness tester and is reported as a Knoop hardness number. Reverse Impact was tested according to the procedures of ASTM D2794-69. Water resistance was determined by immersing cured panels in boiling water for one hour and examining the coating for damage such as blistering or delamination. Adhesion was tested according to ASTM D3359-74.

The coatings prepared in Example 2 above were tested according to the preceding methods. The results are summarized in Table II.

TABLE II

| Run | Knoop Hardness | Reverse Impact, in-lbs | % Adhesion |
|---|---|---|---|
| 1 | 6.4 | >10,<20 | 95 |
| 2 | 13.5 | >20,<30 | 100 |
| 3 | 17.3 | <4 | 0 |
| 4 | 19.4 | <4 | 2 |
| 5 | 16.6 | <4 | 0 |
| 6 | 15.2 | <4 | 99 |
| 7 | 12.6 | <4 | 100 |
| 8 | 16.8 | <4 | 10 |

EXAMPLE 4

A second sample of hemi-formal was prepared according to the procedure of Example 1 except that a strong acid resin was employed as the catalyst. Removal by filtration resulted in a highly pure product uncontaminated with residual catalyst. Tables III and IV indicate compositions and physical properties of the resulting cured coatings after formulation, curing and testing according to the procedures employed in Examples 2 and 3.

TABLE III

| Run | Wt. Acrylic Resin[1] (g) | Solvent | Wt. Solvent (g) | Wt. Melamine resin[2] (g) | % Volatiles |
|---|---|---|---|---|---|
| 1 | 2.75 | hemi-formal | 2.60 | 4.48 | 29.4 |
| 2 | 2.75 | " | 2.60 | 5.60 | 28.6 |
| 3 | 2.75 | " | 2.60 | 6.72 | 29.3 |

[1]Acryloid ® AT-400
[2]Cymel ® 325

TABLE IV

| Run | Knoop Hardness | Reverse Impact, in-lbs | % Adhesion |
|---|---|---|---|
| 1 | 4.9 | 20 | 100 |
| 2 | 5.0 | 30 | 100 |
| 3 | 2.9 | >20,<30 | 100 |

EXAMPLE 5

A coating composition was prepared utilizing an epoxy resin, a melamine/formaldehyde resin, a reactive diluent and a catalyst. Panels were coated and cured according to the procedure of Examples 2 and 3. The results are contained in Tables V and VI.

TABLE V

| Run | Wt. Epoxy Resin[1] (g) | Solvent | Wt. Solvent (g) | Wt. Melamine resin[2] (g) | Wt. Catalyst[3] (g) | % Volatiles |
|---|---|---|---|---|---|---|
| 1 | 1.35 | Ethoxyethyl acetate | 3.50 | 0.15 | 0.007 | 72.0 |
| 2 | 1.35 | PGM | 3.50 | 4.43 | 0.007 | 30.8 |
| 3 | 1.35 | " | 3.50 | 5.54 | 0.007 | 29.9 |
| 4 | 1.35 | " | 3.50 | 6.65 | 0.007 | 26.6 |
| 5 | 1.35 | hemi-formal | 350 | 4.21 | 0.02 | 28.4 |
| 6 | 1.35 | hemi-formal | 3.50 | 5.26 | 0.02 | 26.6 |

[1]A commercially available high molecular weight diglycidyl ether of bisphenol A sold as DER ® 667 epoxy resin.
[2]Hexamethoxy methyl melamine, equivalent weight = 65 g, available as Cymel ® 303.
[3]p-Toluene sulfonic acid.

TABLE VI

| Run | Knoop Hardness | Reverse Impact, in-lbs | % Adhesion |
|---|---|---|---|
| 1 | 12.7 | 40 | 100 |
| 2 | <2.8 | >30,<40 | 100 |
| 3 | 5.3 | >40 | 100 |
| 4 | <2.8 | 40 | 100 |
| 5 | 11.0 | >4,<10 | 99 |
| 6 | 17.0 | >4,<10 | 99 |

EXAMPLE 6

A coating composition was prepared utilizing an epoxy resin, a urea-formaldehyde resin, a reactive diluent and a catalyst. Results are contained in Tables VII and VIII.

TABLE VII

| Run | Wt. Epoxy Resin[1] (g) | Solvent | Wt. Solvent (g) | Wt. Urea-Formaldehyde resin[2] (g) | Wt. Catalyst[3] (g) | % Volatiles |
|---|---|---|---|---|---|---|
| 1 | 2.34 | EE-Acetate/xylene | 4.35 | 1.64 | — | 58.2 |
| 2* | 2.34 | PGM | 4.35 | 8.92 | 0.01 | 49.7 |
| 3* | 2.34 | " | 4.35 | 9.91 | 0.01 | 51.9 |
| 4 | 2.34 | hemi-formal | 4.35 | 9.56 | 0.05 | 36.6 |
| 5 | 2.34 | hemi-formal | 4.35 | 10.76 | 0.05 | 36.3 |
| 6 | 2.34 | hemi-formal | 4.35 | 11.95 | 0.05 | 35.6 |

*Cured at 175° C.
[1]A low melting resin of diglycidyl ether of Bisphenol A sold as DER ® 661 epoxy resin.
[2]A urea/formaldehyde resin sold commercially as Cargill ® 2156 having equivalent weight of 59.
[3]p-Toluene sulfonic acid.

TABLE VIII

| Run | Knoop Hardness | Reverse Impact, in-lbs | Water Resistance | % Adhesion |
| --- | --- | --- | --- | --- |
| 1 | 4.8 | >10,<20 | 5% blush, blister | 100 |
| 2 | 10.5 | >4,<10 | 5% delam. | 100 |
| 3 | 11.1 | >4,<10 | 100% delam. | 100 |
| 4 | 7.4 | 20 | no effect | 90 |
| 5 | 5.5 | >20,<30 | 1% blush | 90 |
| 6 | 4.8 | 20 | 2% blush | 50 |

What is claimed is:

1. A curable composition comprising:
(A) x parts by weight of a hydroxyl-bearing polymer;
(B) about 0.05x to about 3.0x parts by weight, which represents y-moles, of a liquid polyglycol hemi-formal diluent of the formula

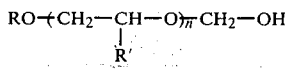

wherein R is a hydrocarbyl group of 1 to about 20 carbon atoms, R' is independently each occurrence hydrogen or methyl, and n is a positive number; and
(C) an aminoplast or phenolic resole resin, capable of curing component (A) to a tack-free state, present in a quantity of from about (0.20x+z) to about (2.5x+5z) parts by weight, z being equal to y multiplied by the equivalent weight of said aminoplast or phenolic resole resin.

2. The composition of claim 1 wherein component (A) is selected from the group consisting of free-hydroxyl containing polyester, free-hydroxyl containing solid epoxy resins, and homo- copolymers of vinyl alcohol, hydroxy-alkylacrylates and α,β-unsaturated acids.

3. The composition of claim 1 wherein component (B) has an atmospheric boiling point of about 150° C. or greater.

4. The composition of claim 1 wherein in component (B), R' is methyl in one or more occurrences.

5. The composition of claim 1 wherein in component (B), R' is methyl in a majority of occurrences.

6. The composition of claim 1 wherein in component (B), n is equal to 4 or greater.

7. The composition of claim 1 wherein in component (B), R' each occurrence is methyl, n is equal to about 4 or greater and R is methyl.

8. The composition of claim 1 wherein component (C) is a melamine-formaldehyde resin.

9. The composition of claim 1 wherein component (C) is present in from about 0.20x+1.25z up to about 2.5x+3z, parts by weight.

10. The composition of claim 1 additionally comprising a strong or weak acid present in from about 0.0005x to about 0.05x part by weight.

11. The composition of claim 1 which further comprises a pigment.

12. The composition of claim 1, 10 or 11 which has been heated at a temperature and for a time sufficient to cure said composition to a tack-free finish.

* * * * *

UNITED STATES PATENT AND TRADEMARK OFFICE
CERTIFICATE OF CORRECTION

PATENT NO. : 4,314,925

DATED : February 9, 1982

INVENTOR(S) : Sandra Berazosky and Harry A. Smith

It is certified that error appears in the above—identified patent and that said Letters Patent is hereby corrected as shown below:

Column 1, line 22, "aminoplastic" should read -- aminoplast --.

Column 6, line 17, Table V, column 4, line 5, "350" should read -- 3.50 --.

Column 8, line 6, Claim 2, line 4, "homo- copolymers" should read -- homo- and copolymers --.

Signed and Sealed this

Twenty-fifth Day of May 1982

[SEAL]

Attest:

Attesting Officer

GERALD J. MOSSINGHOFF

Commissioner of Patents and Trademarks